Patented Dec. 12, 1939

2,183,234

UNITED STATES PATENT OFFICE 2,183,234

OIL RESISTANT COMPOSITION

William H. Butler, Palisades Park, N. J., assignor to Bakelite Corporation, New York, N. Y., a corporation of Delaware No Drawing. Application December 22, 1936, Serial No. 117,148

4 Claims. (Cl. 260—43)

This invention relates to coating compositions and to products comprising bases of paper, cloth, and the like that are coated thereby, the compositions in their final coated form being characterized by flexibility and resistance to petroleum oils and greases. The products of paper or the like that are so coated are intended for example, to be used for containers for lubricating oils.

The present invention is directed to compositions of the oil type for securing imperviousness or resistance to oils and greases. Oils alone cannot be used since they are tacky or sticky when applied and require a long time to dry by oxidation or polymerization; and the coatings made therefrom become hard and brittle upon aging and lose flexibility. It has been found, however, that if the oils are blown or polymerized, that is, if the oils are oxidized or partially oxidized by blowing air through them in the presence of a catalyst (such as an oxide of lead) or the oils are polymerized or partially polymerized by heating to a temperature ranging from 350 to 560° F., the foregoing objections to oils can be overcome. The term "processed" is herein used to signify oils which have either been blown or polymerized by heat or both. Such processed oils are extremely viscous, having a Saybolt viscosity at 200° F. of 75 to 600, and since they are in a condition of oxidation or polymerization they undergo little or no further change when exposed to atmospheric conditions; consequently there is substantially no drying action involved, the deposited films suffer no substantial deterioration due to oxidation and as a result they maintain their flexibility. Preferably blown or polymerized fish oils are employed, but blown or polymerized vegetable oils as linseed, soyabean, rapeseed, castor, Perilla, and in general any vegetable, marine or animal oil that can be oxidized or polymerized can be substituted.

In themselves blown or polymerized oils are not sufficiently grease and oil resistant. A marked improvement in this respect is obtained by including a heat-convertible resin, i. e., one that hardens by the action of heat. The heat-reactive or convertible resins, which are of the phenol-formaldehyde type and which do not require modification with rosin or other natural resins to render them oil-soluble, are particularly useful. The resin can be incorporated into blown or polymerized oil by heating the mixture.

When heat treatment is used in incorporating a heat-convertible resin in a bodied oil, however, the viscosity increases and the flow of the composition is reduced; such an increase in viscosity also takes place when attempts are made to apply the convertible resin and oil composition by means of fusing or melting the composition instead of thinning with volatile solvents. The customarily followed procedure of thinning with volatile solvent to give a reduced viscosity for coating has the objection of forming penetrative compositions and thus more of the compositions than is necessary for coating is used; and films deposited by penetrating coatings are apt to be discontinuous with consequent exposure of unprotected fibers or base material to absorb oil or grease. Distinct advantages residing in viscous compositions which become fluent upon heating is that penetration is minimized, since there is an immediate lowering of the temperature when the thin film of the heated composition is spread over a comparatively cool surface, and the coating formed becomes continuous.

It has been found that the desired flow characteristics for coating operations by heating without the use of volatile solvent and without objectionable modification of the resistance to grease and oils can be obtained by including as an added ingredient of the composition a resin which is thermoplastic, i. e. nonconvertible by the action of heat, or in other words one that does not lose its fusible property upon heating. Such a resin imparts fluidity to the composition at elevated temperatures so that it can be applied to a paper or cardboard base by various methods as hot roll coating, hot spraying or hot flow coating. Resins which are non-convertible under the action of heat and found to be most satisfactory are those resins consisting chiefly of highly oxidized abietic acid and other resin acids; these are available on the market under the trade-mark Vinsol. Other resins which are suitable are the cumarone or indene resins; and phenol formaldehyde resins of the novolak or so-called permanently fusible type and particularly those obtained by the acid condensation of para-alkyl or aryl substituted phenol with formaldehyde have been found satisfactory. These non-heat-convertible resins are all hard, brittle resins softening above 150° F., usually between 180–210° F., and are soluble in fatty oils and in toluol, xylol or similar hydrocarbon solvents. The addition of the non-convertible type of resin not only renders the composition sufficiently fluid under the action of heat for coating purposes, but it gives a coating which can be softened after it is applied by heating and in this way it functions as an effective sealing composition that is useful, for example, to seal in the ends or caps on containers or cartons.

The proportions of processed oil and resinous components found preferable range from 1 part to 4 parts of the resinous content to 2 parts of the oil; and the preferred proportions of heat-convertible to heat-non-convertible resin range from 5.0 to 1.5 parts of the latter to each part of the former. These proportions, however, are subject to variation. If, for example, a more flexible product is desired but with a lesser degree of grease resistance, then the oil content may be increased. Or if a greater degree of grease resistance is desired then the proportion of resinous ingredient can be increased, but the composition will have a lowered flexibility. If less fluidity and thermoplasticity are desired then the amount of heat non-convertible resin can be decreased with a resulting improvement in grease and oil resistance.

The compounding of these various ingredients is preferably carried out as follows. A heat-convertible resin that is, a resin which can be rendered infusible and insoluble by heat and which has been prepared from phenol and an aldehyde by condensing a mixture of high boiling tar acids with formaldehyde in the presence of an alkaline catalyst (or a fusible phenolic type of resin to which a suitable methylene containing agent has been added to render it heat-convertible) is dispersed in a blown vegetable, marine or animal oil and this composition heat at a temperature of 300 to 450° F. until it is converted to a viscous, partially polymerized material which gels when cooled but which is still dispersible when hot in the heat-non-convertible resin added at this point. The composition is now further heated to still more elevated temperatures ranging from 450 to 550° F. The resulting composition is then cooled and it is a highly viscous thermoplastic mass softening at 175 to 200° F. and quite fluid at temperatures over 300° F. It is usually quite dark colored, although this depends to a great extent on the color of the raw materials.

A somewhat simpler but less satisfactory procedure, and one which produces a coating composition having a lesser degree of grease resistance, is that of heating a heat-non-convertible resin with a blown oil at a temperature of about 450° F. for a short period of time, usually one half hour, and the mixture is cooled to about 300° F., at which point the heat-convertible resin is introduced. The resulting composition is further heated for about a half hour or until the temperature has been raised to 400° F., when the composition is cooled. Its appearance and characteristics are similar to those obtained by the first method, except that for similar proportions of ingredients the grease and oil resistance of the coating composition is inferior.

It is possible to use a wide variety of heat-convertible resins; but, as before stated, those resins of the phenol-formaldehyde type which do not require modification with rosin or other natural resins to render them oil soluble are preferred. Such resins can be prepared from cresol, xylenols, high boiling tar acids or from alkyl and/or aryl substituted phenols having not more than two of the positions ortho, ortho prime, or para unsubstituted, as for example, alkyl or aryl substituted phenol such as amyl or butyl phenol or phenyl phenol, by reacting them with formaldehyde in the presence of from one to two per cent of an alkaline catalyst based on the amount of phenol used, until a resinous layer separates either with or without neutralization of the catalyst; these resins after dehydration either at atmospheric but preferably under diminished pressure are hard brittle resins softening above 120° F. and usually between 150–180° F., soluble in fatty oils and toluol, xylol and similar hydrocarbon solvents. In their place there can be used the fusible resins prepared from such phenols by reacting them with formaldehyde in the presence of an acid catalyst until resin separation occurs; these resins after dehydration are hard, brittle fusible resins, softening above 150° F., and usually between 180–210° F., soluble in fatty oil and toluol and xylol, and can be rendered heat convertible provided sufficient methylene containing agent is added, usually about 10–20% of the fusible resin. Or there can be substituted hard, brittle heat-convertible resins of the alkyd resin type, that is resins prepared by reacting glycerol with a polybasic acid or acid anhydride such as phthalic anhydride and softening above 100° F. to replace part, say up to 80–90% of the heat-convertible phenolic resins; the compositions prepared using the higher proportion of alkyd resin do not harden or set quite as readily as those compositions containing a major portion of heat-convertible phenolic resin. All of these heat-convertible resins become infusible when heated to temperatures above 250–320° F.

In order to more clearly indicate the methods employed in carrying out the invention, the following typical examples are given:

*Example 1.*—20 parts of a heat-convertible oil soluble resin, prepared by reacting one part of a mixture of tar acids boiling between 435° F. to 485° F. with one part of formalin in the presence of an alkaline catalyst, for example ammonia, are dispersed in 100 parts of blown fish oil and the dispersion is heated at 300 to 320° F. for about 15 minutes: 100 parts of a fusible resin, such as Vinsol, are added and the temperature of the mixture is increased to 450 to 500° F., and then the mixture cooled to room temperature.

The resulting dark colored thermoplastic resin-like product begins to soften at 180 to 190° F. and becomes quite fluid with a viscosity of about 40 to 45 centipoises at 300 to 350° F.; at room temperature it is so viscous a liquid that the viscosity can best be determined by thinning three parts of resin with one part toluol; and the viscosity of the solution at room temperature is above 800 centipoises, usually approximating 3000 centipoises.

*Example 2.*—80 parts of Vinsol, 100 parts of blown fish oil are heated at 450° F. for 30 minutes. The mixture is cooled to 300° F. and there is added 20 parts of a heat-convertible, oil-soluble resin, such as is described in Example 1; the mixture is raised to a temperature of about 400° F. in 30 minutes. The mixture is a resin-like product similar in its properties to that described in Example 1.

*Example 3.*—25 parts blown castor oil and 90 parts blown fish oil are run to 450° F. in 30 minutes. The mixture is cooled to 300° F. in about 20 minutes, and to this is added 20 parts of a heat-convertible resin prepared by first reacting 100 parts of para amyl phenol with 100 parts of formaldehyde (37.5% solution) in the presence of 1 to 2 parts of sodium hydroxide, until resin formation, and then removing the water from the reaction mixture, preferably by distillation under diminished pressure. Addition of the resin to the oil mixture decreases the temperature to 250° F., and the mixture is again heated to 320° F. in about 25 minutes and maintained at this temperature for 15 minutes. 80 parts of a fusible resin (Vinsol) are added and the mix heated further to 400° F. in 25 minutes. The mixture, on cooling, is a dark colored, thick, viscous liquid resin-like composition. A solution of 3 parts of this composition in 1 part toluol has a viscosity above 800 centipoises, usually approximating 3000 centipoises.

*Example 4.*—70 parts of cumar resin, 100 parts of blown fish oil are heated at 450° F. for 30 minutes. The mixture is cooled to 300° F., and to this are added 30 parts of a resin prepared by reacting 100 parts para phenyl phenol with 80 parts of a 37.5 per cent solution of formaldehyde in the presence of acid catalyst and to which has been added about 5 parts hexamethylenetetramine to render it heat-convertible. The mixture is now heated to about 400° F. in 30 minutes. When cool, the resulting composition is viscous, dark colored and resinous, 3 parts of which dissolved in 1 part of toluol gives a solution having a viscosity above 800 centipoises and approximating 2800 centipoises.

*Example 5.*—20 parts of a heat-convertible, oil soluble resin, made according to Example 1, are dispersed in 120 parts of blown linseed oil and the dispersion is heated at 300 to 320° F. for about 15 minutes. 100 parts of an oil-soluble, permanently fusible phenolic resin, made by reacting 100 parts of tar acids boiling between 435° F. to 485° F. with 50 parts formalin in the presence of 1 part oxalic acid, are added and the temperature of the mixture is raised to 450° F. It is held at this temperature for 10 minutes and the mixture is then cooled to room temperature. The resulting thermoplastic resin-like composition begins to soften at 210° F. and is fairly fluid at 350° F. The softening point of the film obtained with this composition is higher than that disclosed in Example 2.

*Example 6.*—The viscous, thermoplastic composition disclosed in Example 1 can be made more oil and grease resistant at higher temperatures and the softening point of the film obtained with this composition raised about 25° F. by reacting 100 parts of this composition with 2 parts of paraformaldehyde in an open kettle at 210° F. to 265° F. for 20 minutes. The temperature is then raised to 400° F. to remove volatile ingredients. The softening point of this resin is about 200 to 210° F.

*Example 7.*—A neutral oil resistant product is made by first reacting 80 parts of Vinsol and 100 parts of blown fish oil with 6.4 parts of glycerine. The mixture is heated slowly to 540° F. It is then cooled to 300° F. and 20 parts of a heat-convertible, oil-soluble resin, as described in Example 1, are added. The mixture is raised to a temperature of about 400° F. The resulting mixture is a resinous product similar to that obtained in Example 2, except that the acid value is reduced to about 8 and the resulting film is more heat-resistant.

*Example 8.*—A heat-convertible alkyd resin is prepared by heating one part of glycerol with 2 parts phthalic anhydride to about 410° F. The resulting resin is hard and brittle, having a softening point of about 140° F. and is soluble in acetone but insoluble in fatty oils and in hydrocarbon solvents. 50 parts of this resin, 130 parts Vinsol and 50 parts of blown fish oil are heated to 500° F. and an additional 150 parts of blown fish oil added. This addition causes a temperature drop of about 100° F. and the mix is therefore reheated to 450° F. and 20 parts of a heat-reactive phenol resin as described in Example 2 is added, and heating is continued until solution is effected. The composition is then cooled. It is a dark colored resin having a melting point of about 160° F.

*Example 9.*—A composition similar to that described in Example 8 but somewhat softer can be prepared by increasing the amount of Vinsol to 140 parts and decreasing the heat-reactive phenol resin to 10 parts. Such a composition softens at about 140° F. and is suitable for use when a softer, somewhat more flexible type of coating composition is desired. Its viscosity measured by dissolving 3 parts of resinous composition in 1 part toluol is above 800 centipoises and approximates 2000 centipoises at room temperature.

The preferred practice of the invention is that of applying the composition hot as a viscous liquid without any volatile solvent addition. The composition, however, can be used in the form of a solution in a volatile solvent or thinner. In the solution form it has been found that the incorporation of a pigment which includes some zinc oxide results in an enamel that does not materially penetrate into paper or other porous base; zinc oxide is preferred but other reactive metallic oxides, as iron oxide, can be used. Such an enamel accordingly makes a suitable primer or sizing coat for a porous base; the same solution but omitting the pigment filler can then be applied as a top coat. An example follows for illustration.

*Example 10.*—About 40 parts of a resin composition prepared as in Example 2 is dissolved in 60 parts of toluol. To this is added a filler consisting of about 30 parts of titanium oxide and about 4 parts of zinc oxide. The mass is then ground to secure a homogeneous distribution. The enamel so formed can be applied to a paper tube or other porous base by dipping or spraying and allowing the coated article to air-dry. For a top coat about 50 parts of the same resin composition dissolved in about 50 parts of toluol can be applied over the air-dried primer coat.

These compositions are found very satisfactory for coating paper, cardboard, pulp board and the like, or they can be used to coat cloth, canvas or similar materials; they can also be used to coat asbestos. Since the raw materials used in their composition are relatively cheap, and only simple and inexpensive equipment is required for their application it is possible to fabricate at little cost many types of containers, boxes, cartons, pails, etc. from the cheaper grades of paper or board. Such containers will be highly resistant to grease and oil and consequently can be used for lubricating oil, greases, etc.; or they can be used for certain chemicals such as dilute hydrochloric acid solutions of sodium acid sulfate. It is possible to coat thin or thick paper stock that is either flexible or rigid. While reference is made particularly to the use of these compositions in connection with the making of oil and grease resistant containers, it may of course be advantageous to use them for other purposes where a thermoplastic flexible coating composition is desired.

For application of these compositions to a base material a roll rotating in a vessel can be used to pick up a thin film of material and transfer it to the base where it cools and sets to a grease and oil resistant film requiring no further drying or heat treatment. If desired only a small quantity of material need be heated to the temperature of application, since means can be taken to continuously replenish the vessel carrying the roll; in this way further economies in heating are effected. A film having a thickness of 7 to 15 mils is usually applied, although satisfactory grease and oil proofing has been obtained with thinner films, and flexibility will be retained even though somewhat thicker films should be found to be desirable. The high viscosity of the coating solution and the fact that it is applied hot results in very little or any penetration of the coating into the paper; consequently adequate oil and grease resistance is obtained with only a very thin film of material. While the coating is still warm the coated paper can be shaped into the desired carton, box or container. Or the containers can be first formed and the coating applied to the surface of the container which is thereby rendered oil and grease proof. Or the container can be only partially shaped, as for example, coated paper can be shaped to a cylindrical form, or cylinders of paper or cardboard can be coated, and then the ends are closed by discs either of paper or of a material other than paper such as metal, the coating composition flowing sufficiently by heating at the ends to form an effective seal between the cap and the body of the container. While the coating method by a rotating roll described above is preferred, it is also possible to spray the heated composition onto the material to be coated before or after shaping. Both of these methods involve losses and difficulties which are overcome by roll coating.

The heat-convertible resins, to which this invention relates, are those resins which upon heating lose their fusible or meltable condition and no longer flow at the heating temperature and thus become infusible at that temperature; a resin is customarily tested for this property by spreading it as a film upon a plate generally heated to about 160° C. The time in which it takes a resin to set up to the non-flowing condition on the hot plate is also observed, and it is a resin which hardens within a period of from one to ten minutes that is regarded as being heat-convertible within the purview of the present invention. The resin reaction is directed to the formation of the heat-convertible type when it takes place in the presence of a base present in catalytic proportions, i. e. one-fifth of a mol or less of the base for each mol of the phenol.

What is claimed is:

1. Process of preparing a product of flexible character and resistant to oils and greases which comprises forming an oil-soluble heat-reactive resin from a phenol having a hydrocarbon substituent in the ortho or para position and reacted with an aldehyde in the presence of an alkaline compound in catalytic proportions of one-fifth mol or less for each mol of the phenol, dispersing the resin in an oil processed to a Saybolt viscosity at 200° F. of 75 to 600, heating the dispersion to a temperature of from 300 to 450° F., adding to the dispersion a thermoplastic resin, heating the composition to a temperature ranging from 450 to 550° F., the proportion of processed oil to the resinous component ranging from 1 to 4 parts of the resinous content to 2 parts of the oil and the proportion of heat-convertible to thermoplastic resin ranging from 1.5 to 5 of the latter to each part of the former to give a composition softening a temperature of 175 to 200° F. or above.

2. Process of preparing a composition resistant to oils and greases which comprises forming an oil-soluble heat-reactive resin from a phenol having a hydrocarbon substituent in the ortho or para position and reacted with an aldehyde in the presence of an alkaline compound in catalytic proportions of one-fifth mol or less for each mol of the phenol, dispersing the resin in an oil processed to a Saybolt viscosity at 200° F. of 75 to 600, heating the dispersion to a temperature of from 300 to 450° F., adding to the dispersion a thermoplastic resin selected from the group of oxidized resin acids, coumarone resins and novolaks, heating the composition to a temperature ranging from 450 to 550° F., the proportion of processed oil to the resinous component ranging from 1 to 4 parts of the resinous content to 2 parts of the oil and the proportion of heat-convertible to thermoplastic resin ranging from 1.5 to 5 of the latter to each part of the former to give a composition softening at a temperature of 175 to 200° F. or above.

3. Process of preparing a composition resistant to oils and greases which comprises forming an oil-soluble heat-reactive resin from a phenol having a hydrocarbon substituent in the ortho or para position and reacted with an aldehyde in the presence of from 1 to 2 per cent of an alkaline catalyst based on the weight of the phenol, dispersing the resin in an oil processed to a Saybolt viscosity at 200° F. of 75 to 600, and including in the dispersion a thermoplastic resin selected from the group of oxidized resin acids, coumarone resins and novolaks, the proportion of processed oil to the resinous component ranging from 1 to 4 parts of the resinous content to 2 parts of the oil and the proportion of heat convertible to thermoplastic resin ranging from 1.5 to 5 of the latter to each part of the former to give a composition softening at a temperature of 175 to 200° F. or above.

4. Composition suitable for coatings resistant to oils and greases comprising about 2 parts of an oil processed to a Saybolt viscosity at 200° F. of 75 to 600, and having dispersed therein about 1 to 4 parts of a resinous component comprising from 1.5 to 5 parts of a thermoplastic resin selected from the group of oxidized resin acids, coumarone resins and novolaks, to 1 part of a heat-convertible resin prepared from a phenol having a hydrocarbon substituent in the ortho or para position and reacted with an aldehyde in the presence of an alkaline compound in catalytic proportions of one-fifth mol or less for each mol of the phenol, said composion softening at a temperature of 175 to 200° F. or above to a condition suitable for coating.

WILLIAM H. BUTLER.